Oct. 26, 1965   H. J. STRAUSS   3,214,501
METHOD OF MAKING NON-ADHESIVE, HIGHLY COHESIVE MICROPOROUS
PLASTIC BANDAGE MATERIAL OR THE LIKE
Filed Sept. 12, 1961   2 Sheets-Sheet 1

United States Patent Office 3,214,501
Patented Oct. 26, 1965

3,214,501
METHOD OF MAKING NON-ADHESIVE, HIGHLY COHESIVE MICROPOROUS PLASTIC BANDAGE MATERIAL OR THE LIKE
Howard J. Strauss, Elkins Park, Pa., assignor to Esb-Reeves Corporation, Glenside, Pa., a corporation of Delaware
Filed Sept. 12, 1961, Ser. No. 137,658
11 Claims. (Cl. 264—49)

This invention relates to the method of making a non-adhesive, highly cohesive microporous plastic sheet material and has for an object the provision of a non-adhesive, highly cohesive microporous plastic particularly suitable for bandages or the like and method of making the same.

In the preparation of microporous plastic materials which are to be laminated to other sub-strata, one of the principal difficulties encountered is in providing a proper adhesive to the sub-strata layer which will not interfere with the ability of the microporous material to "breathe." Such adhesive-coated microporous plastic materials are particularly suited for use as adhesive bandages and other surgical wrappings and dressings. The difficulty encountered heretofore is that the application of an adhesive to the microporous plastic materials reduces the total vapor or gas transmission of such a microporous plastic by an amount controlled by the surface area of the microporous plastic covered by the adhesive and the vapor or gas transmission characteristics of the adhesive itself. Adhesives commonly used for such purpose have substantially no gas or vapor transmission and the application of such adhesives in a geometrical pattern, even though in very fine lines of adhesive, cuts down the overall transmission available by that fraction of the surface which is covered by the adhesive itself. This has been the normal approach in the past to the application of adhesives to bandage backings. An alternative approach used heretofore has been the application of extremely thin layers of adhesives which do provide a small amount of vapor or gas transmission. Such adhesives are usually applied over the entire surface, and while the adhesive does cut down the gas and vapor transmission by an amount governed by its resistance to the diffusion of such materials, as long as a sufficient layer of adhesive can be maintained, the effectiveness of the microporous material will not be completely removed.

The present invention eliminates the need of providing the microporous plastic material with an adhesive on the surface thereof. It makes an ideal material for use as bandages, surgical wrappings or dressings since it is non-adhesive and, thus, does not adhere to the body. The microporous plastic of the present invention by being highly cohesive sticks tightly to itself but does not decrease its microporosity to a substantial degree.

In accordance with the present invention, a highly cohesive resin is physically alloyed with a plastic base prior to its being made microporous. In this way, a high degree of cohesiveness can be imparted to the microporous resin itself, and by the selection of a proper cohesive material, as for example butyl rubber, this property can be achieved without any significant degree of adhesiveness being imparted to the finished product.

Further in accordance with the invention, there is provided a method of making a non-adhesive, highly cohesive plastic sheet material by alloying a highly cohesive resin with a plastic base at a temperature within the softening range of the resin and plastic, forming the alloy into a sheet, and thereafter making the sheet microporous to increase its cohesive power.

More particularly, the present invention provides a method of making a non-adhesive, highly cohesive plastic sheet material by blending together polyethylene and finely divided starch at an elevated temperature and for a time sufficient to soften the polyethylene and below that which produces charring of the starch, blending the mixed polyethylene and starch with butyl rubber, and thereafter shaping the alloy of polyethylene, starch and butyl rubber into sheet material, and leaching the starch particles from the alloy to produce microporosity of the sheet material with a resultant increase in its cohesive power.

For further objects and advantages of the invention, reference is to be had to the following description taken in conjunction with the accompanying drawings in which.

Figure 1:
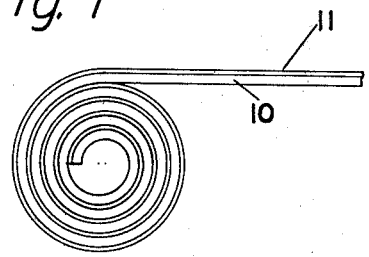
FIG. 1 is an elevational view of a roll of non-adhesive, highly cohesive microporous plastic strip material embodying the present invention.

Referring to FIG. 1, the non-adhesive, highly cohesive microporous plastic material has been shown as a strip 10 having a release paper or fabric strip 11 on one side to prevent sticking of the microporous material 10 when it is supplied in roll form. The microporous material 10 may be produced by blending together polyethylene and finely divided starch at an elevated temperature and for a time sufficient to soften the polyethylene and below that which produces charring of the starch. A suitable mixture has been found to be about 100 parts of polyethylene to 400 parts of corn starch. The polyethylene and starch may be blended within the temperature range of about 220° F. to 320° F. Charring of the starch is minimized at the higher temperatures by mixing it rapidly and for a shorter period of time than at the lower temperatures. A suitable method of mixing the starch and polyethylene is described and claimed in U.S. Patent 2,676,929, Duddy, where continued wiping action takes place by differential rolls.

When the starch and polyethylene are thoroughly blended, butyl rubber in the order of 50 parts is milled into the mixture before transferring the mixture to a calender where it can be sheeted to the desired form. The mixing or blending of the butyl rubber is done in the same temperature range as mentioned above. It is also to be noted that because of the plasticization action of the butyl rubber, the mixture can also be readily extruded. The order of mixing is not particularly critical. However, the above sequence of steps has been found to be satisfactory.

After shaping of the mixture of starch, polyethylene and butyl rubber into sheet material, the sheet material is immersed in an aqueous bath at a temperature below that which produces substantial expansion of the starch particles. This may be accomplished by immersing the sheet material in plain water, or alternatively, in an alkaline solution about 2% sodium hydroxide at a temperature not exceeding about 140° F. The temperature of the bath is then raised to about its boiling point for expansion of the starch particles. The expanded starch particles are then removed from the sheet material to produce microporosity of the sheet material. The starch removal may be accomplished by leaching. The sheet material may be immersed in a dilute solution of acid, such as sulphuric acid, of 2% to 3% maintained at 210° F. which hydrolyzes and solubilizes the starch. The time required for removal of the starch is relatively short since the sheet material is relatively thin, such time being in the order of about ten to fifteen minutes.

The pore size of the microporous material may be controlled by selection of the starch used as the pore forming agent. Where fine pores are required, for example as in the case of the microporous plastic adhesive bandage backing material 10, FIGS. 1–3, the pore forming agent may be selected from the starches which have fine particle sizes such as rice, corn or wheat. Where a significantly larger pore size is desired, as in the pad 14 of the bandage, FIG. 2, a coarser particle size starch, such as potato starch would be used. In addition, the method of starch removal involves first swelling the starch in boiling water. Subsequently, the starch is removed by solubilizing through hydrolysis. If the hydrolyzing bath is above the deformation temperature of the plastic, the pores so formed will be free to return to their original size, i.e., the size of the particle of starch from which they were formed. This is referred to as the normal pore form. If however the hydrolysis is carried out at temperatures sufficiently low to prevent thermal movement of the plastic, the pore will assume the size of the expanded particle of starch, i.e. referred to as the expanded pore form. Thus it is possible to control the size of the pore from very small sizes (i.e., of the order of 1 micron) all the way up to extremely coarse pores (i.e., of the order of 300 microns) by a combination of the selection of the particular source of starch and the preparation to expanded or normal pore form.

The resultant sheet produced by the above method is highly microporous with a good interconnecting pore structure which provides for high vapor and gas transmission. The butyl rubber does influence the properties of the resultant sheet to the extent that it increases the elasticity and elongation over that of pure polyethylene, but to some degree reduces the tensile strength. This combination of properties is quite satisfactory for bandage applications, and as a matter of fact the increased elasticity permits application of the bandage to highly irregular surfaces.

Figure 3:
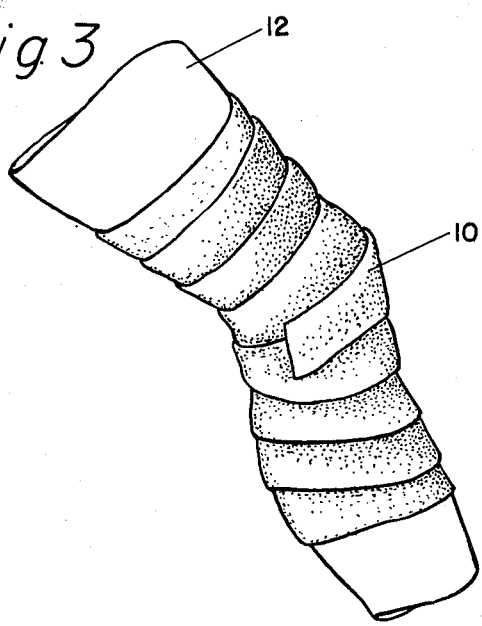
FIG. 3 is a perspective view illustrating the cohesive microporous material used as a finished bandage.
Figure 4:
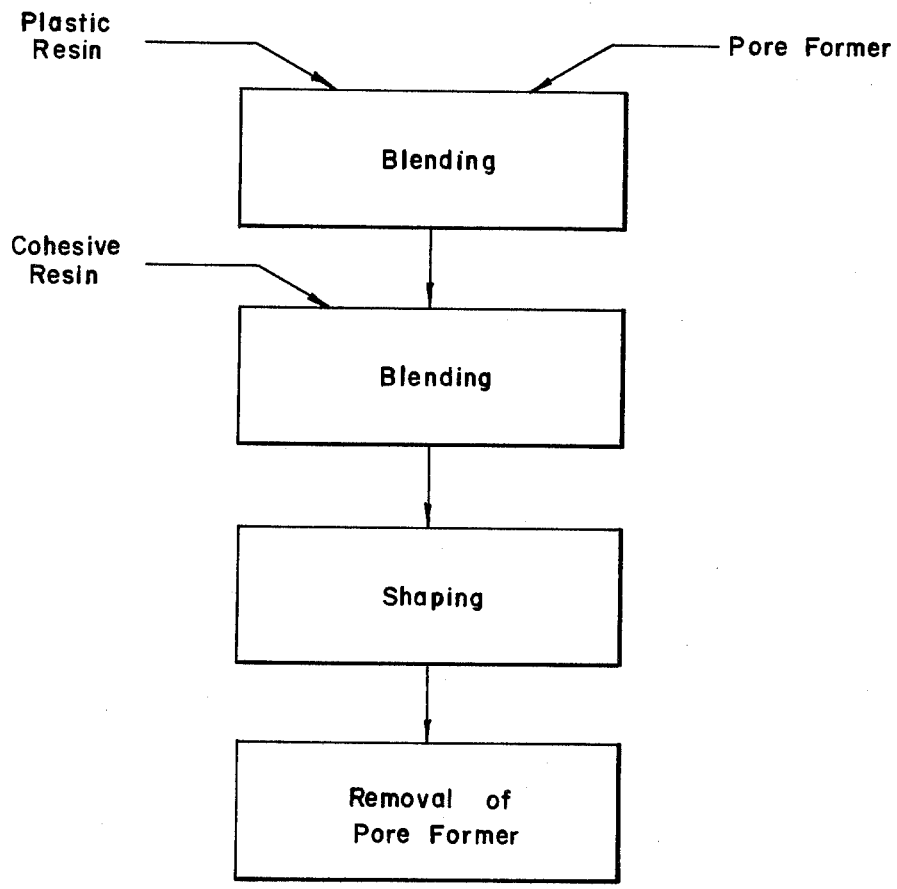
FIG. 4 is a flow diagram illustrating the method of making a non-adhesive, highly cohesive microporous plastic material in accordance with this invention.

Such an application of the microporous sheet material 10 is shown in FIG. 3 where the material has been used as the bandage for a knee of leg 12. Such types of bandages or wrappings are particularly useful to athletes in wrapping various joints of the body. The sheet material 10, by reason of its microporosity and inclusion of butyl rubber, is highly cohesive and, thus, readily sticks to itself when one layer engages another. This prevents the various layers of the bandage 10 from slipping relative to each other. At the same time the material 10 of the bandage, by being microporous, permits the leg 12 to breathe through the bandage. The overlapping of the layers of the bandage 10 does not sacrifice to any substantial degree the original porosity and/or gas and vapor transmission of the material 10. The material 10, by reason of its increased elasticity, permits the knee to be bent when wrapped in a bandage as shown in FIG. 3. This minimizes discomfort to the wearer. It has also been found that the gas and vapor transmission and cohesion both are improved by a slight stretching of the material 10 during its application.

Since the material 10 is highly cohesive, it sticks to itself and no additional adhesive is required to maintain the bandage in place. Additionally, since the material 10 is non-adhesive, it does not adhere to the skin of the wearer.

Figure 2:
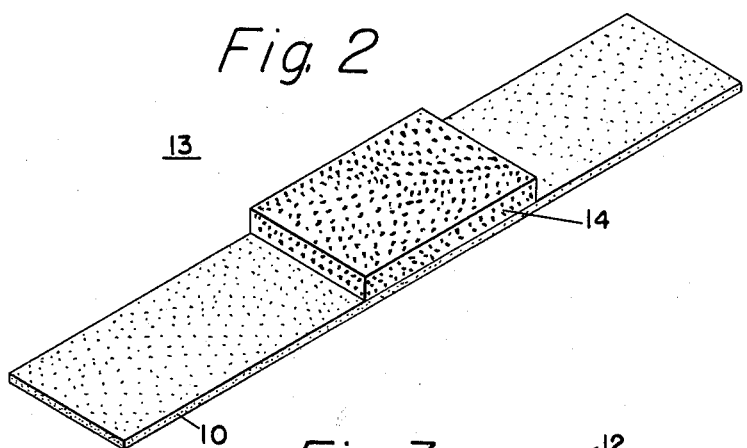
FIG. 2 is a perspective view of a strip-type bandage and pad of the microporous material embodying the present invention.

In FIG. 2 there is shown a bandage 13 including a strip of the material 10 having cohesively attached thereto a pad 14 of the non-adhesive, highly cohesive microporous plastic material. The microporous material 14 is provided with larger pores, as above described, than those in the strip 10. This permits the pad 14 which is adapted to engage the wound or cut to absorb the blood or other fluid and at the same time permits gas and vapor transmission through not only the pad 14 but also the bandage 10. The pad 14 is cohesive with the bandage strip 10 and, thus, it will remain in place relative to the strip 10 in the manner shown in FIG. 2. However, since the pad 14 is non-adhesive, it does not stick to the wound and, thus, minimizes discomfort to the patient when the bandage or dressing is being changed or removed. All that is necessary to maintain the bandage 13 in place is to wrap the end portions of the strip 10 so that they will overlap each other. The overlapping portions are maintained in engagement by the cohesive power of the microporous material.

By mixing the starch, polyethylene and butyl rubber in the ratio of about 4:1:½ and thereafter removing the expanded starch particles, there results a plastic alloy which is microporous. The rubber is chemically unchanged and imparts to the alloy its characteristics. It has been found that when the ratio of starch to plastic material (i.e., polyethylene plus alloying resin) falls below the ratio of 2:1, there is a very sharp and significant fall-off in the water vapor transmission capabilities of the resultant sheet material. The theory as to why the microporous alloy of polyethylene and butyl rubber has such high cohesive power is not fully understood, but it is believed to be due to the fact that the surface of the material, although apparently smooth, is microscopically very rough and very extended due to the microporosity and, thus, enables rubber-to-rubber contact over a greater area than would be possible for a non-microporous alloy of polyethylene and butyl rubber. It has been found that the cohesive power of the microporous alloy of polyethylene and butyl rubber produced in accordance with the present invention is several times greater than that of non-microporous polyethylene and butyl rubber.

Removable solid fillers of the anhydrous type other than starch may be used, such, for example, as dry powdered sugar or salt. The starch may be replaced in whole or in part by the sugar and in approximately the same proportions since sugar and starch have approximately the same specific gravities. Where salt is used as the filler, it is necessary to replace the starch by approximately twice its weight of salt to compensate for the differences in specific volumes.

While the preferred form of the invention has been described and illustrated, it is to be understood that other modifications thereof may be made within the scope of the appended claims.

What is claimed is:

1. The method of making a non-adhesive, highly cohesive microporous plastic sheet material which comprises mixing and blending together polyethylene and finely divided starch in ratio of starch to polyethylene of about 4:1, during the blending applying at elevated temperature a continued wiping action by differential rolls, said temperature being within the range of a softening temperature of polyethylene and below that which produces charring of the starch, blending butyl rubber into the mixture of polyethylene and starch to form a composition having a ratio of starch to polyethylene to butyl rubber of about 4:1:½, shaping the mixture of starch, polyethylene and butyl rubber into sheet material, immersing the sheet material in an aqueous bath at a temperature below that which produces substantial expansion of the starch particles, thereafter elevating the temperature of the bath for expansion of the starch particles, and leaching the expanded starch particles from the mixture to produce microporosity of the sheet material.

2. A method for making a non-adhesive, highly cohesive microporous plastic comprising the following steps:
   (a) blending a composition consisting essentially of a highly cohesive resin, a plastic resin base material and a pore forming agent at a temperature within the softening range of said cohesive resin and plastic resin base material, with said plastic resin base material being present in a major amount and said cohesive resin being present in a minor amount,
(b) forming the blended resins into a predetermined shape, and
(c) removing said pore forming agent from the shaped resin blend to render it microporous.

3. A method in accordance with the method of claim 2 in which the pore forming agent is selected from the group consisting of starch, sugar and an inorganic salt.

4. A method in accordance with the method of claim 3 in which the plastic resin base material is polyethylene.

5. A method in accordance with the method of claim 4 in which the cohesive resin is butyl rubber.

6. A method in accordance with the method of claim 5 in which the pore forming agent is starch, and the ratio of starch to polyethylene plus butyl rubber is at least about 2:1.

7. A method of making a non-adhesive, highly cohesive microporous plastic comprising the steps of:
(a) blending a composition consisting essentially of a plastic resin base material and a pore forming agent at a temperature within the softening range of said plastic resin base material,
(b) incorporating a minor amount of a highly cohesive resin into the composition of step (a) and thoroughly blending the resulting mixture at a temperature within the softening range of said cohesive resin and plastic resin base material,
(c) forming the resin blend into a predetermined shape, and
(d) removing said pore forming agent from the shaped resin blend to render it microporous.

8. A method in accordance with the method of claim 7 in which said pore forming agent is selected from the group consisting of starch, sugar and an inorganic salt.

9. A method in accordance with the method of claim 8 in which the plastic resin base material is polyethylene.

10. A method in accordance with the method of claim 9 in which the cohesive resin is butyl rubber.

11. A method in accordance with the method of claim 10 in which the pore forming agent is starch, and the ratio of starch to polyethylene plus butyl rubber is at least about 2:1.

References Cited by the Examiner

UNITED STATES PATENTS

| | | | |
|---|---|---|---|
| 2,254,915 | 9/41 | Sawyer | 128—156 |
| 2,337,390 | 12/43 | Hinkamp et al. | 128—156 XR |
| 2,542,527 | 2/51 | Honey et al. | 18—48 XR |
| 2,646,796 | 7/53 | Scholl | 128—165 XR |
| 2,735,426 | 2/56 | Claydon | 128—156 |
| 2,740,402 | 4/56 | Scholl | 128—156 |
| 2,802,240 | 8/57 | Thomas | 18—48 |
| 2,826,509 | 3/58 | Sarbach | 18—48 XR |
| 2,864,777 | 12/58 | Greenhoe. | |
| 2,928,130 | 3/60 | Gray | 18—48 |
| 3,020,597 | 2/62 | Smith-Johannsen | 18—57 |
| 3,053,253 | 9/62 | Liloia et al. | 128—156 |

ROBERT F. WHITE, *Primary Examiner.*

RICHARD J. HOFFMAN, MORRIS LIEBMAN, ALEXANDER H. BRODMERKEL, *Examiners.*